W. B. THOMPSON.
VEHICLE SPRING.
APPLICATION FILED AUG. 13, 1912.
1,066,164. Patented July 1, 1913.
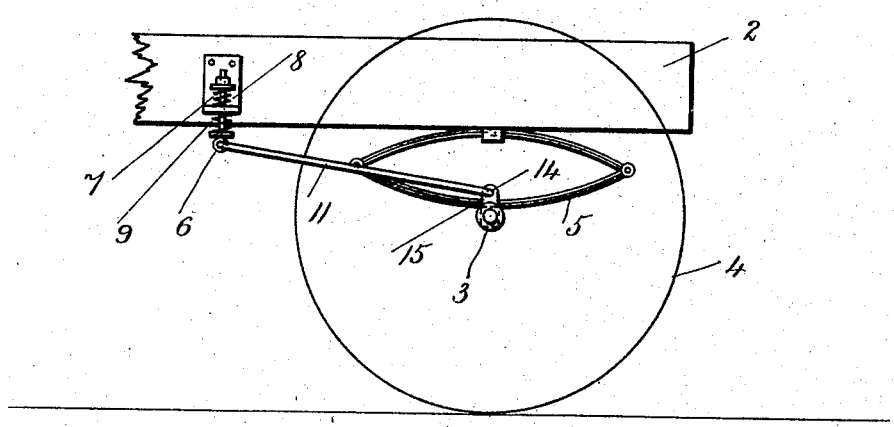
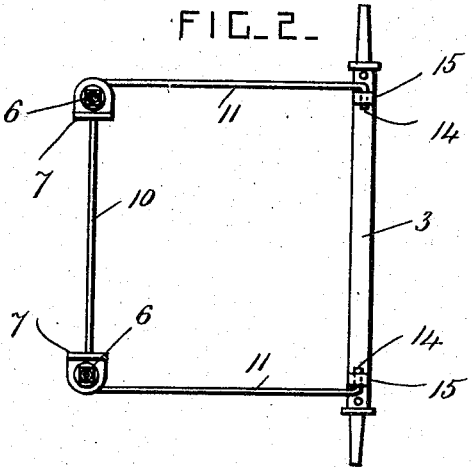
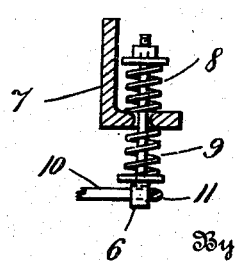
Witnesses
H. Carter.
Walter Allen
Inventor
Willis B. Thompson
Herbert W. Jenner
By
Attorney

UNITED STATES PATENT OFFICE.

WILLIS B. THOMPSON, OF STEWARD, ILLINOIS.

VEHICLE-SPRING.

1,066,164.  Specification of Letters Patent.  Patented July 1, 1913.

Application filed August 13, 1912. Serial No. 714,787.

*To all whom it may concern:*

Be it known that I, WILLIS B. THOMPSON, a citizen of the United States, residing at Steward, in the county of Lee and State of Illinois, have invented certain new and useful Improvements in Vehicle-Springs; and I do hereby declare the following to be a full, clear, and exact description of the invention, such as will enable others skilled in the art to which it appertains to make and use the same.

This invention relates to springs for vehicles such as heavy wagons; and it consists in the novel construction and combination of the spring guiding attachments hereinafter fully described and claimed, whereby the vertical movements of the ground wheels are regulated.

In the drawings, Figure 1 is a side view of portions of a vehicle provided with spring guiding attachments according to this invention. Fig. 2 is a plan view of the guide arms and shaft. Fig. 3 is a detail view of one of the eye-bolt connections.

The body 2 of the vehicle is provided with a rear axle 3 and two similar ground wheels 4, and 5 are leaf springs arranged between the axle and the body, one at each end portion of the axle. All of these parts are of any approved construction.

In order to limit the vertical movement of one ground wheel with relation to the other ground wheel, two eye-bolts 6 are arranged to slide vertically and loosely in two bearing brackets 7 which project from the sides of the vehicle body in front of the rear road wheels. Helical springs 8 and 9 are arranged around the eye-bolts above and below the bearings, so that the eye-bolts may slide vertically and tilt to a limited extent in their bearings. A shaft 10 is journaled loosely in the eye-bolts, and extends crosswise under the vehicle body. Arms 11 project from the ends of this shaft, and the shaft and arms are preferably formed integral with each other. The free end portions of the arms 11 have laterally projecting pins 14 which engage loosely with bearing blocks 15, which are bolted to the axle 3 and arranged near the leaf springs.

In passing over rough ground the vertical movements of one wheel are transmitted to the other wheel through the guiding arms and shaft, which are formed of resilient material such as steel, and the body is prevented from tipping to an undesirable extent. This often prevents accidents and upsets, as one leaf spring can only go down to a limited extent farther than the other.

This device can be applied to all kinds of wagons, heavy trucks and automobiles.

What I claim is:

1. The combination, with a vehicle body, an axle provided with road wheels, and springs supporting the body from the axle; of brackets secured one on each side of the vehicle body, supports free to rock and to slide vertically in the said brackets, springs between the said supports and brackets, and a cross-shaft journaled in the said supports parallel to the axle and having longitudinally projecting arms at its ends which are pivotally connected with the said axle.

2. The combination, with a wagon body, an axle provided with road wheels, and springs supporting the body from the axle; of brackets secured to the vehicle body one at each side thereof, eye-bolts engaging with the said brackets, helical springs arranged around the eye-bolts above and below the brackets and permitting the eye-bolts to tilt and to slide vertically, a shaft journaled in the eye-bolts and extending crosswise under the vehicle body and having arms at its ends which terminate in laterally projecting pins, and bearing blocks for the said pins secured to the end portions of the axle.

In testimony whereof I have affixed my signature in the presence of two witnesses.

WILLIS B. THOMPSON.

Witnesses:
 L. A. PARKER,
 R. MORTON.

Copies of this patent may be obtained for five cents each, by addressing the "Commissioner of Patents, Washington, D. C."